Patented Nov. 26, 1929

1,737,104

UNITED STATES PATENT OFFICE

MAX BERGMANN, EUGEN IMMENDÖRFER, AND HERMANN LOEWE, OF DRESDEN, GERMANY

PROCESS FOR THE TREATMENT OF ANIMAL AND VEGETABLE FIBERS

No Drawing. Application filed December 12, 1923, Serial No. 680,278, and in Germany December 18, 1922.

When treating animal and vegetable fiber with acid, alkaline or neutral substances, or with oxidizing agents a more or less considerable damaging of the mechanical properties of the fiber frequently occurs.

Now we have found that this damaging can be avoided and that sometimes even an improvement of the mechanical properties of the fiber can be obtained if the fiber, either previous to or during the action of the agent which are per se prejudicial to the mechanical properties of the fiber, is treated with tanning materials or their products of conversion or with similar substances. Of prime importance there may be used the commonly used vegetable tannic materials, as quebracho and myrobalen extracts and other vegetable tanning materials, further artificial and especially organic tannic bodies as for instance condensation products of formaldehyde with aromatic sulpho-acids, the so-called neradole and other tanning condensation products containing aromatic residues, aliphatic and hydroaromatic tanning bodies and the like, or the conversion products of the vegetable tannic materials as the so-called phlobaphenes, produced by the action of heat or oxygen of the air or by treatment with acids from numerous vegetable tanning materials, and the humus substances which are chemically closely related to the phlobaphenes. Such technical waste products which contain vegetable or artificial tanning materials or are obtained from the same, particularly the discharged waste liquids from tanneries can also be used as protecting means for fibers.

The treatment of the animal fiber with such protecting substances can be applied during the washing, fulling, dyeing, liming of skins or slackening of hides, cleansing and working of hides with lime-water, deadening of hides, carbonizing, or during the oxidizing processes as bleaching processes and in the chromic acid treatment in dyeing, mordanting, macerating and tanning processes.

In the treatment of the vegetable fiber the protection is of importance in the bleaching of the fiber by oxidizing means as well as in such treatment of products obtained from such fibers, the fiber, as is well known, losing in such treatment considerably in resisting capacity and in quality if it is not treated, in accordance with this invention, with special protecting substances. A similar protection of the vegetable fibers is further of importance where they have to be treated for instance with chromic acid compounds, chlorates, persulphates, peroxides, such as for instance in aniline black dyeing.

In the treatment of animal fibers as well as of vegetable fibers the simultaneous prejudicial influence of acid or alkaline substances and of reducing or oxidizing agents on the fiber can be prevented also, either by the action of one single tanning material or the like, or by the application of a mixture of such substances. In all these cases it is possible to preserve completely or almost completely the mechanical properties of the fiber, and this result is obtained by the action of the tanning materials added.

The invention will be hereinafter explained by a number of examples:

*Example 1.*—25 grams of wool are treated for half an hour at 60° C. with a solution consisting of 5 liters of water, 300 grams of anhydrous sodium carbonate and 10 to 15 grams of oak tanning material. The skein of wool is then rinsed and dried. Tested on Schopper's shake-willy in comparison with raw yarn the skein shows an increase of extensibility of 60% and an increase of mechanical resistance of 10%, whereas without the use of the tanning material the capacity of mechanical resistance decreases 20%. A similar result is obtained if valonia tanning material is used.

*Example 2.*—In the treatment of wool with caustic alkali solution, in vat dyeing or with sodium sulphide in the dyeing wth sulphide dyes 25% of exhausted tan liquor is added, the treatment being otherwise as usual. The wool preserves good touch and good appearance, and the capacity of resistance is considerably increased, whereas without the said addition the capacity of resistance is considerably reduced, especially in the sodium sulphide bath, as is well known.

*Example 3.*—In the carbonization of wool with 10% sulphuric acid at 90° C. ½% of the well known synthetic tanning agent as neradole are added. The wool fiber is thus perfectly protected against the unfavorable action of the sulphuric acid.

*Example 4.*—In the liming of skins or slackening of hides, especially of sheep hides an addition of 10 to 20% of waste tan liquor protects the hide, especially the grain, and also the wood against the injurious action of a solution of sodium sulphide of ½ to 1% strength, the hair releasing capability being not impaired in this alkaline soluton.

Instead of the waste liquor from tanning, peat humus dissolved in the required quantity of solution of alkali may also be used and the solution added to the sodium sulphide in the treatment of the hides.

*Example 5.*—In the decortication of silk or in the washing of wool double the quantity of a coal-humus dissolved in alkali is added to the solution of the alkali. Any injurious effect of the alkali is thus avoided.

*Example 6.*—In the bleaching of wool with a solution of 1% sodium hypochlorite at 18° C. the capacity of resistance against tearing is reduced by about 20% after a treatment of half an hour. If however 2% of myrobalan extract as obtained in commerce is added to the bleaching solution the fiber preserves its original good touch, and its strength of tearing is not impaired.

For the myrobalan extract a corresponding quantity of other natural or artificial tanning materials may also be substituted. When the latter are acid the main quantity of the acid is preferably neutralized.

*Example 7.*—When wool is treated with chromic acid solution of 4% concentration at 90° C. during two hours the wool loses 50% of its tearing strength and becomes of mean appearance. An addition of 1% of the total liquid of valonia tanning material has the effect that the fiber is not injured notwithstanding the extremely sharp attack by the excess of the oxidizing agent. Also in this case the other protecting substances mentioned may be substituted for the tanning extract, for instance with a special advantage practically exhausted tan liquor may be employed.

The subsequent dyeing process will not be impaired when the protecting agent is correctly applied.

*Example 8.*—200 grams of scoured raw wool yarn are treated, for bleaching, at ordinary temperature during 8 hours with 1 liter of a sodium peroxide solution of 1% strength, to which 10 grams of humus, dissolved in alkali, are added.

Instead of the humus compounds themselves, as especially the humic acids from peat, lignite and the like dissolved in alkali, the conversion products of such humus substances may also be used, for instance products of the chlorination or exidation of the humus substances which possess the favorable properties of the latter in an undiminished manner even if they do not show the characteristic dark colour of the original humus substances. In the application of such products the soiling of the fiber material is absolutely avoided which otherwise happens easily when humus substances are used and if bleaching substances are not used at the same time.

*Example 9.*—Cotton is treated for one hour at 18° C. with a bleaching liquid containing 3% sodium hypochlorite and 0.5% of the solution of an alkali salt of humic acid. The fiber is energetically bleached thereby, but the mechanical properties of the cotton are not impaired. Without the addition of a protecting substance the cotton loses under these conditions 40% of its tearing strength. Instead of humic acid 0.3% of myrobalan tanning material or 25% of waste vegetable tan liquor may be used with the same effect.

*Example 10.*—In the development of aniline black on the vegetable fiber quebracho tannic material, in a quantity of 10% of the sodium chlorate used, is added in order to protect the fiber, the treatment otherwise being that of any one of the well known processes. Also, in the succeeding chroming it is advisable to add a tanning material in a quantity equal to 5% of the bichromate.

Having now particularly described and ascertained the nature of our said invention, we declare that what we claim is:

1. A method for the protection and amelioration of the mechanical properties of animal and vegetable fibers during their treatment with agents generally impairing the fiber, consisting in treating the fibers with said agents in the presence of water extracts of tan wood and tan bark in available condition.

2. A method for the protection and amelioration of the mechanical properties of animal and vegetable fibers during their treatment with chemical agents generally impairing the fiber, consisting in treating the fiber with said chemical agents and at the same time with water extracts of such woods and barks which originally contain tanning materials in a water soluble condition.

3. A method for the protection and amelioration of the mechanical properties of animal and vegetable fibers during their treatment with chemical agents generally impairing the fiber, consisting in treating the fiber with said chemical agents in the presence of already used waste liquors from tanning with water extracts of tan wood and tan bark.

4. A method for the protection and amelioration of the mechanical properties of animal and vegetable fibers during their treatment with chemical agents generally impairing the fiber, consisting in treating the fibers with said agents in the presence of a mixture of water extracts of tan woods and tan barks.

5. A method for the protection and amelioration of the mechanical properties of animal and vegetable fibers during their treatment with chemical agents generally impairing the fiber, consisting in treating the fibers with said agents in the presence of a mixture of water extracts of such woods and barks which originally contain tanning materials in a water soluble condition and other tanning materials.

6. A method for the protection and amelioration of the mechanical properties of animal and vegetable fibers during their treatment with chemical agents generally impairing the fiber, consisting in treating the fiber with oxidizing bleaching agents in the presence of available tanning materials.

7. A method for the protection and amelioration of the mechanical properties of animal and vegetable fibers during their treatment with chemical agents generally impairing the fiber, consisting in treating the fiber with said chemical agents in the presence of products which contain water extracts of tan wood and tan bark in available condition.

In testimony whereof we have hereunto set our hands.

PROF. DR. MAX BERGMANN.
DR. EUGEN IMMENDÖRFER.
DR. HERMANN LOEWE.